UNITED STATES PATENT OFFICE.

MARTIN S. WEIST, OF SEDALIA, MISSOURI, ASSIGNOR OF ONE-HALF TO HOLMES HALL, OF SEDALIA, MISSOURI.

VEHICLE-WHEEL.

1,061,344.　　　　Specification of Letters Patent.　　Patented May 13, 1913.

Application filed June 26, 1912. Serial No. 706,053.

*To all whom it may concern:*

Be it known that I, MARTIN S. WEIST, a citizen of the United States, residing at Sedalia, in the county of Pettis and State of Missouri, have invented new and useful Improvements in Vehicle-Wheels, of which the following is a specification.

This invention relates to vehicle wheels and more particularly to spring wheels.

The principal object of the invention is to provide a spring wheel in which the spokes are free of the felly and are resiliently prevented from circumferential movement with relation thereto.

A further object of the invention is to provide a simple and efficient wheel of this character which will take the place of the present pneumatic tired wheel and will avoid all the disadvantages inherent therein, such as punctures and the like, and which will have an equal amount of resiliency.

Further objects of this invention will appear as the following specific description is read in connection with the accompanying drawing, which forms a part of this application, and in which:—

Figure 1:
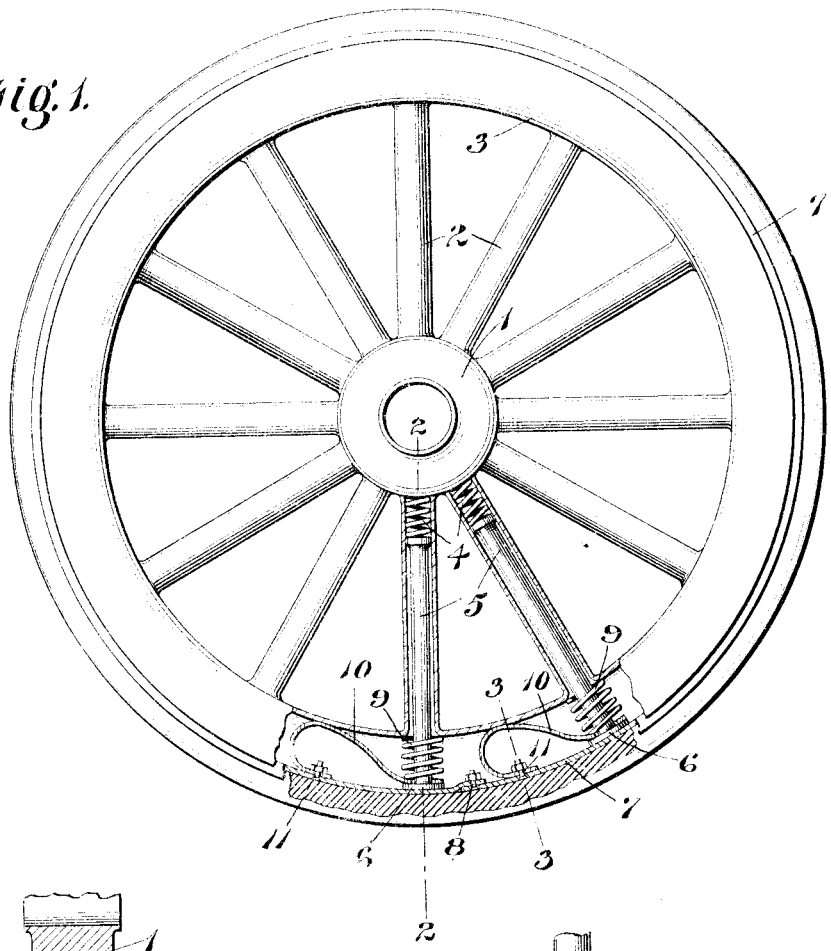
Figure 2:
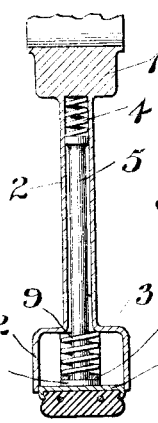
Figure 3:
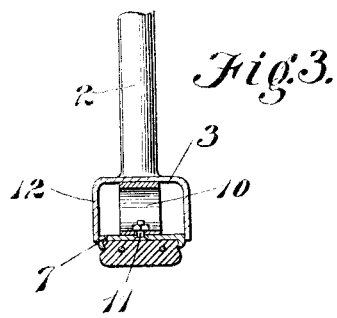

Figure 1 is a detail side elevation with parts broken away. Fig. 2 is a vertical sectional view on the line 2—2 of Fig. 1. Fig. 3 is a similar section on the line 3—3 of Fig. 1.

Referring more particularly to the drawing, 1 represents the hub of the wheel which has radiating therefrom a plurality of spoke tubes 2 which are connected together by a rim 3. Mounted in the tubes and seated against the hub are compression springs 4 which are engaged by the inner ends of the spokes 5 which are slidably mounted in the tubes 2. The outer ends of the spokes are provided with a flat or substantially flat head 6 which abuts the felly or tire rim 7 on its inner face. This rim is constructed in the manner of the ordinary clencher rims and has its ends joined together by a bolt 8.

Surrounding the spokes and arranged between the heads 6 and the rim 3 are springs 9 which are compressed with the springs 4 upon a relative change in position between the rims 3 and felly 7 and also hold against the heads, the ends of the loop springs 10 which are secured to the felly, as shown, by bolts 11. These springs have their ends apertured to receive the spokes and are placed under tension when the heads move upon the felly, as is the case with any of the spokes when they assume a horizontal position and the bottom portion of the felly is raised toward the hub. These springs 10, therefore, prevent circumferential creeping of the spokes on the felly or the opposite condition, the felly creeping upon the spokes, and in order to prevent lateral movement of the felly with relation to the spokes and the rim 3, there are secured to the rim 3 suitable flanges or annular disks 12, which overlap the felly, as shown in Figs. 2 and 3.

What is claimed is:—

In a spring wheel, a hub, a plurality of tubes radiating therefrom, a rim connected to said tubes, spokes slidably mounted in the tubes and having heads, a felly surrounding the spokes and loosely engaged with the head, springs interposed between the heads and the rim and between the ends of the spokes and the hub, and bowed springs carried by the felly and apertured to receive the spokes, said last-named spring being held in engagement with the heads by the springs which are interposed between the heads and the rim, together with a tire carried by the felly.

In testimony whereof I affix my signature in presence of two witnesses.

MARTIN S. WEIST.

Witnesses:
　CARLISLE TAYLOR,
　IRA G. BARTON.